United States Patent [19]
Kohler et al.

[11] Patent Number: 5,806,317
[45] Date of Patent: Sep. 15, 1998

[54] METHOD AND DEVICE FOR SOLAR STEAM GENERATION

[75] Inventors: Wolfgang Kohler, Kalchreuth; Wolfgang Kastner, Herzogenaurach; Konrad Künstle, Röttenbach, all of Germany

[73] Assignee: Siemens Aktiengesellschaft, Munich, Germany

[21] Appl. No.: 714,919

[22] Filed: Sep. 17, 1996

[30] Foreign Application Priority Data

Mar. 17, 1994 [DE] Germany ............... 44 09 197.4

[51] Int. Cl.$^6$ .......................... F01K 3/00; B60K 16/00
[52] U.S. Cl. .......................... 60/659; 60/641.8
[58] Field of Search ................... 60/641.8, 659

[56] References Cited

U.S. PATENT DOCUMENTS

| | | | |
|---|---|---|---|
| 4,167,856 | 9/1979 | Seidel et al. | 60/641.14 |
| 4,171,617 | 10/1979 | Sakamoto et al. | 60/641.8 |
| 4,232,523 | 11/1980 | Derby et al. | 60/641.15 |
| 4,259,836 | 4/1981 | Finckh | 60/39.33 |
| 4,358,929 | 11/1982 | Molivadas | 60/641.8 |
| 4,400,946 | 8/1983 | Oplatka | 60/641.8 |
| 4,423,599 | 1/1984 | Veale | 60/641.8 |
| 4,471,617 | 9/1984 | De Beer | 60/641.11 |
| 4,546,758 | 10/1985 | Ebernard | 126/635 |
| 4,555,905 | 12/1985 | Endou | 60/659 |
| 4,781,173 | 11/1988 | Ven et al. | 126/592 |
| 4,926,643 | 5/1990 | Johnston | 60/691 |
| 5,444,972 | 8/1995 | Moore | 60/39.182 |

FOREIGN PATENT DOCUMENTS

| | | |
|---|---|---|
| 901 640 | 5/1985 | Belgium . |
| 0 106 688 A3 | 4/1984 | European Pat. Off. . |
| 0 206 434 A1 | 12/1986 | European Pat. Off. . |
| 25 53 283 | 6/1977 | Germany . |
| 28 33 890 | 3/1980 | Germany . |
| 29 37 529 C2 | 3/1981 | Germany . |
| 29 39 585 A1 | 4/1981 | Germany . |
| 41 26 036 A1 | 2/1993 | Germany . |
| 41 26 037 A1 | 2/1993 | Germany . |
| 41 26 038 A1 | 2/1993 | Germany . |
| 93/10406 | 5/1993 | WIPO . |

OTHER PUBLICATIONS

European Patent Abstract No. 93/046776.06 (Lezuo et al.).

*Primary Examiner*—Ira S. Lazarus
*Assistant Examiner*—Ljiljana V. Ciric
*Attorney, Agent, or Firm*—Herbert L. Lerner; Laurence A. Greenberg

[57] ABSTRACT

Steam is generated by conducting a medium through a line which is exposed to solar irradiation. The line has a starting point where a medium supply line issues into the line. The heated medium is conducted away from the at least one line through a drain line. The medium, prior to feeding in at the starting point, is prepared in a power plant component and the medium is supplied at a pressure which is higher than the prevailing pressure in the at least one line, and at an enthalpy which is greater than an enthalpy of saturated water in the line. The medium is fed in as water or water and steam.

11 Claims, 2 Drawing Sheets

5,806,317

METHOD AND DEVICE FOR SOLAR STEAM GENERATION

CROSS-REFERENCE TO RELATED APPLICATION

This application is a continuation of international application PCT/DE95/00284, filed Mar. 3, 1995, which designated the United States.

BACKGROUND OF THE INVENTION

FIELD OF THE INVENTION

The invention relates to a method for solar steam generation, where a heat energy absorbing medium flows through at least one line which is exposed to insolation (solar irradiation). The invention also relates to a system for solar steam generation having at least one line, which is to be exposed to the insolation, for a medium which absorbs thermal energy; the line communicates with at least one supply line for the medium and with a drainage line for the evaporated medium.

A system for solar steam generation has become known heretofore from German patent disclosure DE 41 26 036 Al. In that case, a heat-absorbent medium is led consecutively via a line through numerous solar panels with trough collectors which concentrate the solar radiation. There, the medium absorbs thermal energy due to the insolation and, accordingly, it is evaporated.

Were the medium which is to be evaporated fed in only at the starting point of the relatively long line, then an undesired surge flow could ensue, which can impose a mechanical load on the line. Accordingly, medium is fed into the line at a plurality of points in that prior art system. It is thereby ensured that surge flow is avoided.

Nevertheless, the heat transfer conditions in the line (cooling of the line), in particular in the flow direction at the starting point of the line, are not always satisfactory. The water fed in at the start of the line evaporates only slowly in accordance with the introduction of heat, so that only a small flow of steam, which is not sufficient for cooling, is produced. That problem cannot be adequately solved by feeding more water in at the starting point of the line. Since rapid evaporation of a large quantity of water is not possible, the afore-mentioned surge flow would result.

SUMMARY OF THE INVENTION

It is accordingly an object of the invention to provide a method and device for solar steam generation, which overcomes the above-mentioned disadvantages of the heretofore-known devices and methods of this general type and which guarantees sufficient cooling at any time and at every location of the line. The quantity of steam in the line is to be so large that a largely uniform flow in the line is guaranteed. No irregular flows such as surge flows are to result. In addition, good thermal transfer into the medium is to be guaranteed. It was a further object of the invention to define a system for solar steam generation by means of which sufficient cooling of the line and good heat transfer conditions can be guaranteed at all times and at every location of the line.

With the foregoing and other objects in view there is provided, in accordance with the invention, a method of generating solar-heated steam, which comprises:

providing a line having a starting point, conducting a medium through the line at a prevailing pressure, exposing the line to solar radiation, and absorbing thermal energy from the solar radiation in the medium;

feeding water or steam and water into the line as the medium at the starting point at a pressure above the prevailing pressure in the line and at an enthalpy being greater than an enthalpy of saturated water in the line, and causing vaporization of at least a portion of the fed-in water immediately upon entry of the water into the line.

In accordance with an added feature of the invention, the Medium is prepared in a power station, in particular in a water/steam separator vessel and/or a high-pressure turbine of the power station.

In other words, the first of the above-noted objects is satisfied in that there is fed at the starting point into the line a medium which is at a pressure being higher than the pressure which prevails in the line and which has an enthalpy which is greater than the enthalpy of saturated water in the line.

The advantage is that, because of the high enthalpy of the medium, a relatively large quantity of steam is produced or fed in already at the starting point of the line, thus causing a large mass flow of steam. Good cooling behavior advantageously results in the case of large mass flow of steam. No surge flow is produced. Accordingly, good heat transfer into the medium is guaranteed and the disadvantages of surge flow are avoided.

The medium which is fed in may be steam or water or a two-phase system of steam and water. If the medium is steam, a large mass flow of steam is achieved at once. If the medium is entirely or partially water (at high pressure), rapid evaporation of the water (explosive atomization) results immediately after feeding it into the line. This is to be ascribed to the fact that the pressure in the line is lower than the steam pressure of the water fed in. A large quantity of steam is provided in a short time due to the rapid evaporation process. A sufficiently large mass flow of steam is guaranteed by this large quantity of steam.

The medium which is fed in is provided, for example, in a power station. Specifically, in a conventional power station water and/or steam at high pressure is generated for continuous operation. For example, the medium which is fed in is provided in a conventional water/steam separator vessel and/or as extraction steam of a high-pressure turbine.

With the above and other objects in view there is also provided, in accordance with the invention, a system for generating steam with solar radiation. The system, which is bound into a power station, comprises:

at least one line for exposure to solar irradiation, the at least one line having a starting point and conducting a thermal energy-absorbing medium at a prevailing pressure in the at least one line;

a medium supply line communicating with the starting point of the at least one line, and a drain line for transporting heated medium away from the at least one line; and a power plant component connected to the medium supply line and supplying the medium at a pressure which is higher than the prevailing pressure in the at least one line, and at an enthalpy which is greater than an enthalpy of saturated water in the at least one line.

The system is advantageous in that large mass flow of steam is attained in the line, particularly in the critical starting region of the line. This results in superior heat transfer to the heat-absorbing medium. Moreover, no undesired flow conditions such as, for example, surge flows result in the line.

In accordance with an additional feature of the invention, the power station has a circuit with a water/steam separator vessel and/or a high-pressure turbine and the medium is subjected to the higher pressure and the higher enthalpy in the water/steam separator vessel and/or the high-pressure turbine. Media at high pressure and high degree of enthalpy are generated during normal operation of the power station. By coupling the system for solar steam generation to the power station, it is not necessary to provide a special device for generating high pressure medium and large enthalpy medium, because such a device is already present in the power station.

If one of the loops in the power station contains a water/steam separator vessel and/or a high-pressure turbine, those components may be utilized as the above-noted devices which supply the medium at high pressure and at high enthalpy.

For example, the water/steam separator vessel is connected directly on the water side to the supply line. As a result, water at a relatively high pressure which is virtually at the saturation temperature is fed into the supply line. Since in the line of the system for solar steam generation, into which the supply line opens, a pressure prevails which is below the vapor pressure of the water thus fed in, rapid evaporation of the water occurs, which results in the formation of steam flow with a high mass flow. Superior heat transfer is thereby guaranteed in the system.

A high mass flow of steam is also generated when steam at high pressure is fed into the line. For that purpose, the water/steam separator vessel of the power station is, for example, directly connected on the steam side with a supply line which opens into the line of the system.

In accordance with again another feature of the invention, the supply line is directly connected to a steam drain line of a high-pressure turbine of the power plant.

In either case, owing to the high pressure of the steam, a sufficiently large quantity of steam enters into the line, so that satisfactory cooling is ensured.

In accordance with yet a further feature of the invention, at least one make-up feed supply line communicates with the at least one line between the starting point of the line and the drain line. It is sufficient when a medium having a lower enthalpy is fed in through this make-up feed supply line as compared to the medium fed through the supply line. The make-up feed serves to increase the mass flow of steam in the line. At the end of the line there is thus available a high mass flow of steam through which mechanical energy is obtained by means of a turbine.

In accordance with a concomitant feature of the invention, a water container (may be a component of the power station) is connected to the make-up feed supply line, and a pump is connected in the make-up feed supply line between the water container and the starting point of the at least one line.

The primary advantage of the system according to the invention is that the heat-absorbing medium in the system exposed to the insolation flows at a high mass flow of steam and without the formation of irregular flows such as surge flows. Excellent heat transfer is achieved as a result.

Other features which are considered as characteristic for the invention are set forth in the appended claims.

Although the invention is illustrated and described herein as embodied in a method and device for solar steam generation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
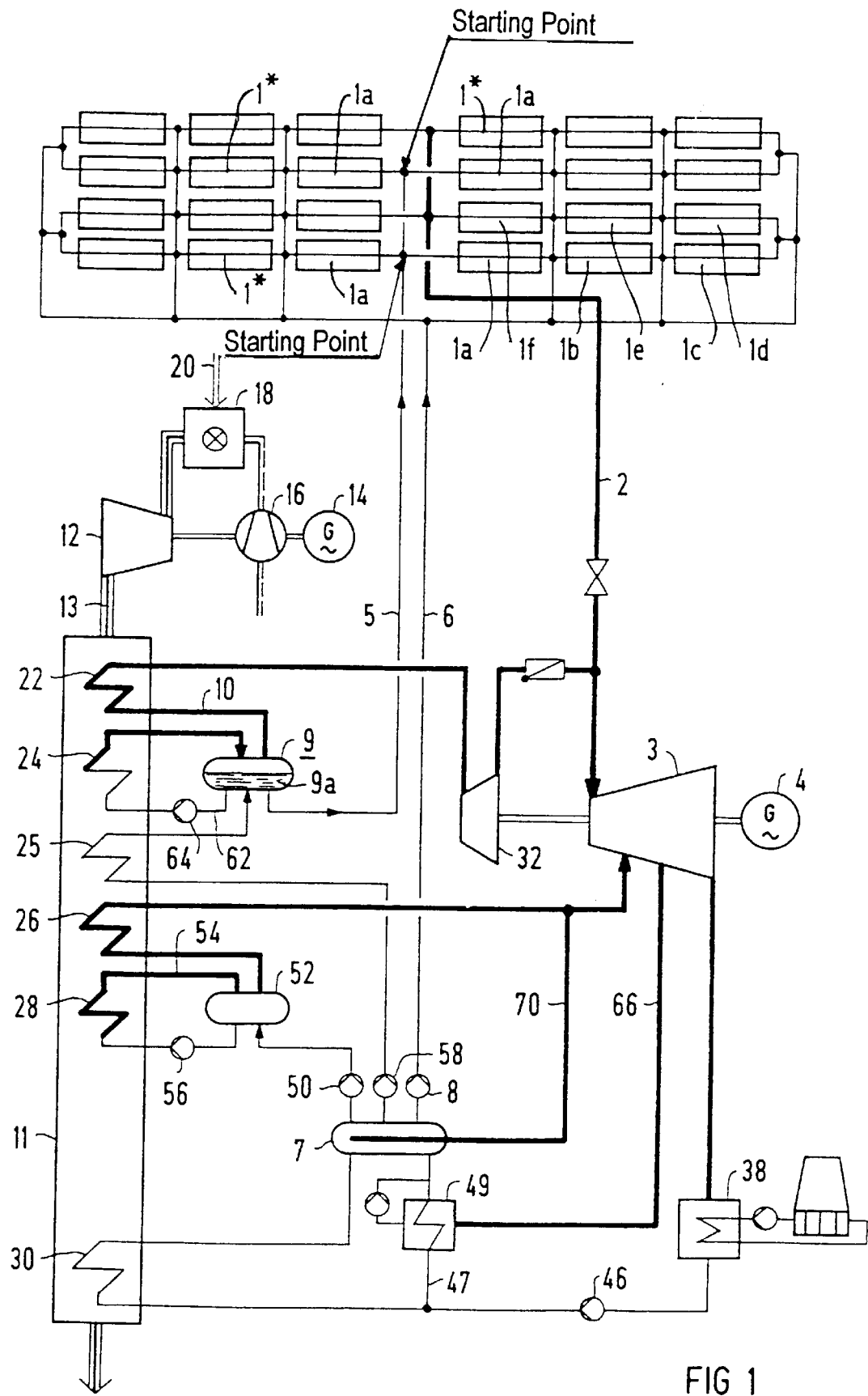
FIG. 1 is a diagrammatic illustration of a first embodiment of the system for solar steam generation according to the invention.

Referring now to the figures of the drawing in detail and first, particularly, to FIG. 1 thereof, there is seen a configuration with a plurality of solar collectors 1 which have lines 1*. The lines 1* carry a flow of a medium. The medium is heated in the solar collectors 1 by radiant and thermal energy of the sun. The heated medium is fed via a drainage line 2 to a turbine 3. The turbine 3 is connected to a generator 4 for producing electric energy. In the exemplary embodiment there are six solar collectors 1a–1f respectively connected in series. Four groups having in each case six solar collectors 1a–1f are operated in parallel. In order for the desired flow of medium through the arrangement of the solar collectors 1 to be possible, it is not sufficient if in a group of six series-connected solar collectors 1a–1f the medium is fed only into the first solar collector 1a in the direction of flow. Instead, it is necessary for medium to be fed as make-up in the direction of flow upstream of each of the six solar collectors 1a–1f. Feeding of the medium into the respectively first solar collector 1a of a group is performed via the supply line 5. A make-up feed supply line 6 is present for all make-up feeds upstream of the downstream solar collectors 1b–1f.

It is important in the method and in the system according to the invention that a dedicated supply line 5 is provided for feeding the medium into the first solar collector 1a of a group of series-connected solar collectors 1a–1f, and that the dedicated supply line 5 is separate from the make-up feed supply line 6. The latter then serves only the purpose of feeding medium as make-up into the downstream solar collectors 1b–1f. The make-up feed supply line 6 connects a water container 7 via a pump 8 to the make-up feed points upstream of the solar collectors 1b–1f downstream (in medium flow direction) of the respectively first collectors. The method and the system according to the invention provide improved feeding of medium via the supply line 5, with the result that a sufficient mass flow of steam is guaranteed through the solar collectors 1. The point in this case is that upon being fed into the first solar collectors 1a the medium transported there in the supply line 5 is at a pressure which is higher than the pressure that prevails in the line 1*, which is integrated in the first solar collector 1a. Furthermore, the enthalpy of the medium fed in via the supply line 5 is to be greater than the enthalpy of saturated water in the line 1*.

The medium fed in through the supply line 5 is water at high pressure which is virtually at the saturation temperature. Upon feeding in superheated water—as referred to the pressure in the line 1*—an explosive partial evaporation of the water results upon entry into the line 1* of a first solar collector 1a. A large quantity of steam is thereby provided, which flows into the line 1* of the solar collector 1a. The large quantity of steam and, in particular, the high rate of flow of the steam advantageously guarantee good cooling of the lines 1* of the series-connected solar collectors 1. The throughflow is further increased in stages by the make-up feed of medium upstream of each downstream solar collector 1b–1f via the make-up feed supply line 6. According to FIG. 1, the water at high pressure is provided by a water/steam separator vessel 9 from whose water space 9a the supply line 5 originates. In FIG. 1, the water/steam separator vessel 9 is a component of a circuit 10 of a power station which also includes a heated heat exchanger 11 and at least one turbine 3.

The power station of the illustrated embodiment includes a gas turbine and steam-turbine power station as disclosed in German patent publication DE 41 26 038 Al. The heat exchanger 11 is heated in that case by exhaust gases of a gas turbine 12. The gas turbine 12 is connected downstream of a combustion chamber 18 into which a fuel line 20 opens. The gas turbine 12 drives a generator 14 and an air compressor 15 connected upstream of the combustion chamber 18. The exhaust gases of the gas turbine 12 pass through an exhaust gas line 13 into the heat exchanger 11. The heat exchanger includes, in the direction of exhaust gas flow, high-pressure superheated heating surfaces 22, high-pressure evaporator heating surfaces 24, high-pressure preheating heating surfaces 25, low-pressure superheated heating surfaces 26, low-pressure evaporator heating surfaces 28, and feedwater preheating heating surfaces 30.

The turbine 3 is a low-pressure turbine. A high-pressure steam turbine 32 is connected upstream of the turbine 3, in the circuit 10. The two turbines jointly drive the generator 4. The low-pressure steam turbine 3 is connected on the exhaust steam side to a condenser 38 which is connected via a condensate pump 46 and the feedwater preheating heating surfaces 30 to the water container 7 for feedwater. The water container 7 is connected via a low-pressure feedwater pump 50 to a water/steam separator vessel 52 of a low-pressure evaporator circuit 54. The latter comprises the low-pressure evaporator heating surfaces 28 and a circulating pump 56. On the steam side of the water/steam separator vessel 52 of the low-pressure evaporator circuit 54 there are connected the low-pressure superheater heating surfaces 26, which are connected in series with the input of the low-pressure steam turbine 3.

The water container 7 is connected as a component of the circuit 10, via a high-pressure feedwater pump 58, to the water/steam separator vessel 9 via the high-pressure preheating heating surfaces 25. The water/steam separator vessel 9 is a part of the high-pressure evaporator circuit 62, which comprises a circulating pump 64 and the high-pressure evaporator heating surfaces 24. On the steam side, the water/steam separator vessel 9 is connected via the high-pressure superheater heating surfaces 22 to the high-pressure steam turbine 32, which is connected in series to the turbine 3. As noted above, the turbine 3 is a low-pressure steam turbine.

A line 66 originating from the turbine 3 is connected to a heat exchanger 49, which is included on the primary side in a branch 47 connected in parallel with the feedwater preheating heating surfaces 30. The primary side and the secondary side of the heat exchanger 49 are connected to the water container 7. In addition, it is possible for a line 70 to be provided which branches off from the connecting line between the low-pressure superheated heating surfaces 26 and the turbine 3. The line 70 then opens into the water container 7.

Figure 2:
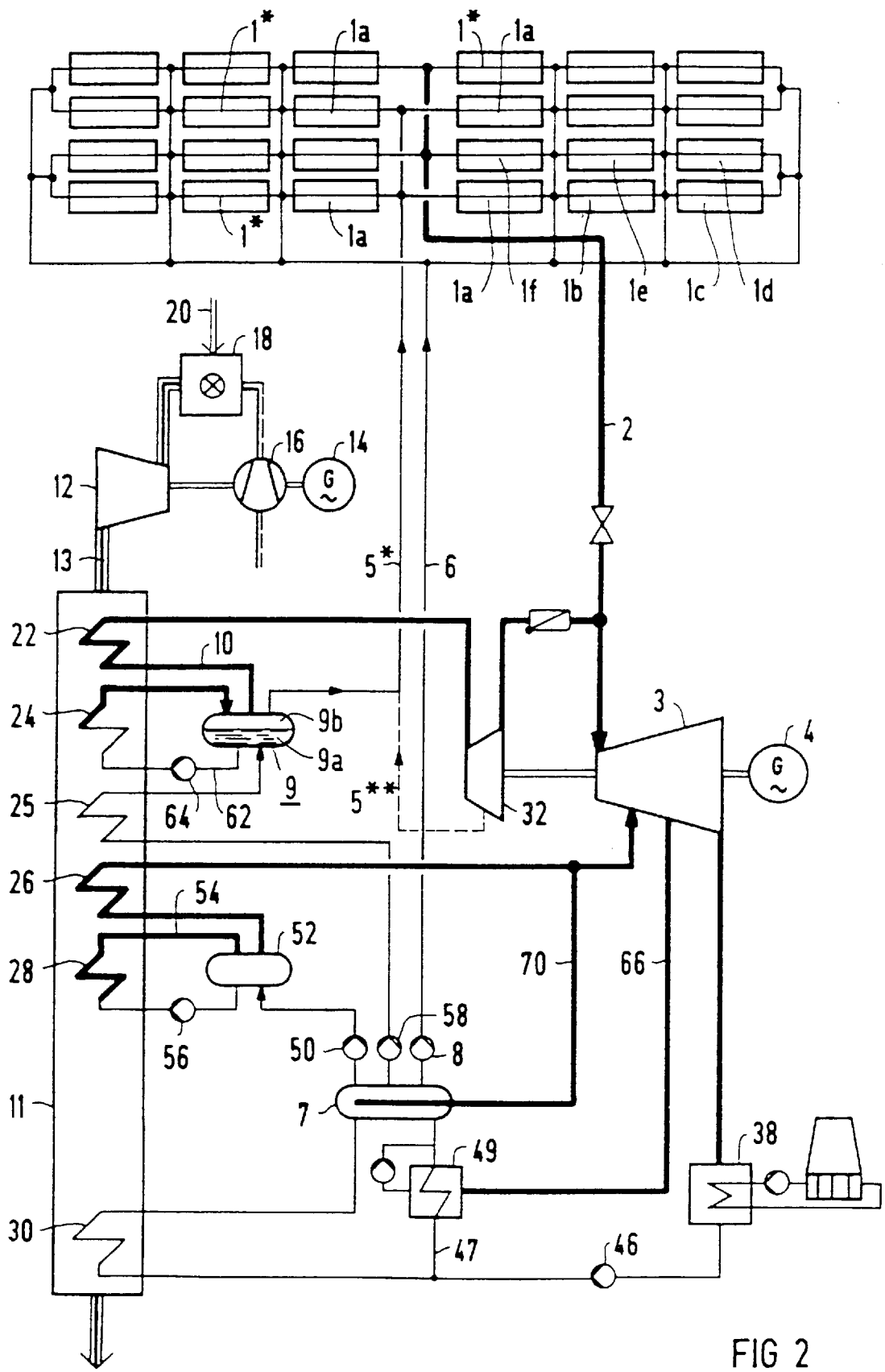
FIG. 2 is a similar view of a second embodiment of the system according to the invention.

FIG. 2 illustrates a variation of the system of FIG. 1. Identical system components are provided with identical reference symbols. The difference in the system according to FIG. 2, as compared with the system according to FIG. 1 is to be seen in the feature that instead of originating from the water space 9a the supply line 5* originates from the steam space 9b of the water/steam separator vessel 9.

Steam at a suitably high pressure and with a suitably high degree of enthalpy is fed immediately from the steam space 9b into the lines 1* of the first solar collectors 1a. Consequently, evaporation is not required there. Owing to the fact that the steam is at high pressure, a satisfactorily large quantity of steam does pass, however, into the first solar collectors 1a. This quantity of steam ensures sufficient cooling. The cooling is further increased by the make-up feed of water into the downstream solar collectors 1b–1f via the make-up feed supply line 6. Instead of originating from the steam space 9b of the water/steam separator vessel 9, the supply line 5 for the steam at high pressure and having a large enthalpy can originate from the high-pressure steam turbine 32, which is located in the circuit 10. The alternative portion of the supply line 5 is shown in dashed lines in FIG. 2. Steam at a suitably high pressure is provided both in the water/steam separator vessel 9 and in the high-pressure steam turbine 32.

We claim:

1. A method of generating solar-heated steam, which comprises:

providing a line having a starting point, conducting a medium through the line at a prevailing pressure, exposing the line to solar radiation having thermal energy, and the medium absorbing the thermal energy from the solar radiation;

feeding water or steam and water into the line as the medium at the starting point at a pressure above the prevailing pressure in the line and at an enthalpy greater than an enthalpy of saturated water at the starting point in the line, and causing vaporization of at least a portion of the fed-in water immediately upon entry of the water into the line.

2. The method according to claim 1, which comprises conveying the medium from a power station to the starting point for feeding in the feeding step.

3. The method according to claim 2, which further comprises conveying the medium through one of a water/steam separator vessel and a high-pressure turbine of the power station.

4. In combination with a power plant, a system for generating steam with solar radiation, comprising:

at least one line adapted to be exposed to solar irradiation, said at least one line having a starting point and conducting a thermal energy-absorbing medium at a prevailing pressure in said at least one line;

a medium supply line communicating with said starting point of said at least one line, and a drain line communicating with and transporting heated medium away from said at least one line; and a power plant component connected to said medium supply line and supplying the medium at a pressure which is higher than the prevailing pressure in said at least one line, and at an enthalpy which is greater than an enthalpy of saturated water at said starting point in said at least one line.

5. The system according to claim 4, wherein the power plant has a circuit with a water/steam separator vessel and/or a high-pressure turbine, and said power plant component is the water/steam separator vessel and/or the high-pressure turbine.

6. The system according to claim 5, wherein said supply line is directly connected to the high-pressure turbine.

7. The system according to claim 4, which further comprises at least one make-up feed supply line communicating with said at least one line between said starting point of said line and said drain line.

8. The system according to claim 7, which further comprises a water container connected to said make-up feed supply line, and a pump connected in said make-up feed supply line between said water container and said starting point of said at least one line.

9. In combination with a power plant, a system for generating steam with solar radiation, comprising:

at least one line adapted to be exposed to solar irradiation, said at least one line having a starting point and conducting a thermal energy-absorbing medium at a prevailing pressure in said at least one line;

a medium supply line communicating with said starting point of said at least one line, and a drain line communicating with and transporting heated medium away from said at least one line;

the power station having a circuit with at least one of a water/steam separator vessel and a high-pressure turbine connected to said medium supply line and supplying the medium at a pressure which is higher than the prevailing pressure in said at least one line, and at an enthalpy which is greater than an enthalpy of saturated water at said starting point in said at least one line; and said water/steam separator vessel having a water side directly connected to said supply line.

10. In combination with a power plant, a system for generating steam with solar radiation, comprising:

at least one line adapted to be exposed to solar irradiation, said at least one line having a starting point and conducting a thermal energy-absorbing medium at a prevailing pressure in said at least one line;

a medium supply line communicating with said starting point of said at least one line, and a drain line communicating with and transporting heated medium away from said at least one line;

the power station having a circuit with at least one of a water/steam separator vessel and a high-pressure turbine connected to said medium supply line and supplying the medium at a pressure which is higher than the prevailing pressure in said at least one line, and at an enthalpy which is greater than an enthalpy of saturated water at said starting point in said at least one line; and said water/steam separator vessel having a steam side directly connected to said supply line.

11. The system according to claim 10, wherein said supply line is directly connected to the high-pressure turbine.

* * * * *

UNITED STATES PATENT AND TRADEMARK OFFICE
CERTIFICATE OF CORRECTION

PATENT NO : 5,806,317
DATED : September 15, 1998
INVENTOR(S): Wolfgang Köhler et al.

It is certified that error appears in the above-identified patent and that said Letters Patent is hereby corrected as shown below:

On title page,
Item [63] should read as follows:

Continuation of PCT/DE95/00284, March 3, 1995

Item [75] should read as follows:

Wolfgang Köhler, Kalchreuth;

Wolfgang Kastner, Herzogenaurach;

Konrad Künstle, Röttenbach, all of Germany

Signed and Sealed this

Twenty-ninth Day of December, 1998

*Attest:*

BRUCE LEHMAN

*Attesting Officer*     *Commissioner of Patents and Trademarks*